United States Patent [19]

Aoyama et al.

[11] Patent Number: 4,871,510
[45] Date of Patent: Oct. 3, 1989

[54] FUEL ASSEMBLY AND REACTOR CORE

[75] Inventors: Motoo Aoyama, Hitachi; Renzo Takeda, Kawasaki, both of Japan

[73] Assignee: Hitachi, Ltd., Tokyo, Japan

[21] Appl. No.: 178,902

[22] Filed: Apr. 7, 1988

[30] Foreign Application Priority Data

Apr. 8, 1987 [JP] Japan .................. 62-84766

[51] Int. Cl.⁴ .............................................. G21C 3/32
[52] U.S. Cl. .................................... 376/444; 376/439; 376/443
[58] Field of Search ........................ 376/444, 439, 443

[56] References Cited

U.S. PATENT DOCUMENTS

| | | | |
|---|---|---|---|
| 4,378,329 | 3/1983 | Uchikawa | 376/435 |
| 4,587,089 | 5/1986 | Takeda | 376/428 |
| 4,629,599 | 12/1986 | Crowther | 376/212 |
| 4,652,426 | 3/1987 | Boyle | 376/352 |
| 4,664,882 | 5/1987 | Doshi | 376/423 |
| 4,683,113 | 7/1987 | Mochida | 376/419 |
| 4,777,016 | 10/1988 | Yoshioka | 376/444 |

FOREIGN PATENT DOCUMENTS 58-179391 10/1983 Japan .
59-178387 10/1984 Japan .

Primary Examiner—Donald P. Walsh
Attorney, Agent, or Firm—Antonelli, Terry & Wands

[57] ABSTRACT

A fuel assembly of the present invention comprises fuel rods which are arranged in 9 rows and 9 columns (9×9) in a channel box. The channel box has a width L between outer walls thereof and a width D between inner walls thereof, both of which satisfy the following equation:

$$0.12 \leq (P-L)/D$$

wherein P denotes the fuel assembly pitch in a reactor core. A sufficient cold shutdown margin for a reactor core can be secured by determining the widths L and D so as to satisfy the above-described equation, even if the average enrichment of the fuel assembly is increased to 4 wt % or more.

9 Claims, 10 Drawing Sheets

FUEL ASSEMBLY AND REACTOR CORE

BACKGROUND OF THE INVENTION

The present invention relates to a fuel assembly, and particularly to a fuel assembly suitable for use in a boiling water reactor (referred to as BWR hereinafter) and a reactor core thereof.

A conventional BWR comprises a core which is constituted by a plurality of fuel assemblies arranged at equal intervals in the form of a lattice. A control rod having a cruciate cross-sectional form is inserted between the fuel assemblies. Such fuel assembly that is loaded in the conventional BWR core comprises fuel rods which are arranged in 8 rows and 8 columns (8×8) in a channel box and two water rods which are arranged at the center thereof, as shown in FIGS. 4A and 4B of Japanese Patent Laid-Open Publication No. 179391/1983 (corresponding to U.S. patent application Ser. No. 360,390 filed on Mar. 22, 1982). The above-described conventional BWR core is shown in FIG. 2 of the Japanese Patent Laid-Open Publication. The enrichment of each of the aforementioned fuel assemblies is decreased in an upper portion thereof in an axial direction thereof in order to increase the cold shutdown margin of a reactor, as shown in FIGS. 4C, 5A and 5B of the Publication.

It is also possible to increase the cold shutdown margin of a reactor by increasing a total cross-sectional area of the water rods in each of the fuel assemblies. An example of such fuel assemblies is shown in FIG. 2 of Japanese Patent Laid-Open Publication No. 178387/1984 (corresponding to West German Patent Application No. 3309449.7 filed on Mar. 16, 1983). This fuel assembly comprises fuel rods which are arranged in 9 rows and 9 columns (9×9) in a channel box and five water rods, each of which has a square cross-sectional form, arranged at the center of the channel box. The five water rods are arranged in a cruciate form.

A fuel assembly with a high level of burn-up has been now developed with the aim of achieving effective utilization of uranium resources. One of methods of obtaining a high burn-up type fuel assembly is to increase the average enrichment of fuel assembly. However, any increase in the average enrichment of the fuel assembly causes a decrease in the cold shutdown margin of the reactor concerned.

SUMMARY OF THE INVENTION

It is an object of the present invention to provide a fuel assembly which can assure a sufficient cold shutdown margin for a reactor.

The present invention is characterized in that, if a distance between the outer walls of a channel box is L, a distance between the inner walls thereof is D, and a pitch of the fuel assemblies arranged in a core is P, the channel box has the distance L between the outer walls and the distance D between the inner walls which satisfy the following equation.

$$0.12 \leq (P-L)/D.$$

DETAILED DESCRIPTION OF THE PREFERRED EMBODIMENTS

The present invention has been achieved on the basis of the investigations described below.

The present invention aims at obtaining a fuel assembly and a reactor core thereof, which requires no change of the reactor members disposed in a reactor vessel even if the fuel assembly becomes a high level burn-up one, i.e., it can be fitted back into a conventional reactor core. The feature that the reactor members need not be changed means that the pitch P of the fuel assemblies in the core (referred to as "fuel assembly pitch" hereinafter) is not changed. Usually, the fuel assembly pitch P employed in conventional BWRs is 6 inches (15.24 cm). The description below concerns an exemplary case in which P is 6 inches; however if P is not 6 inches, the same results are obtained as when P=6 inches.

Figure 4:
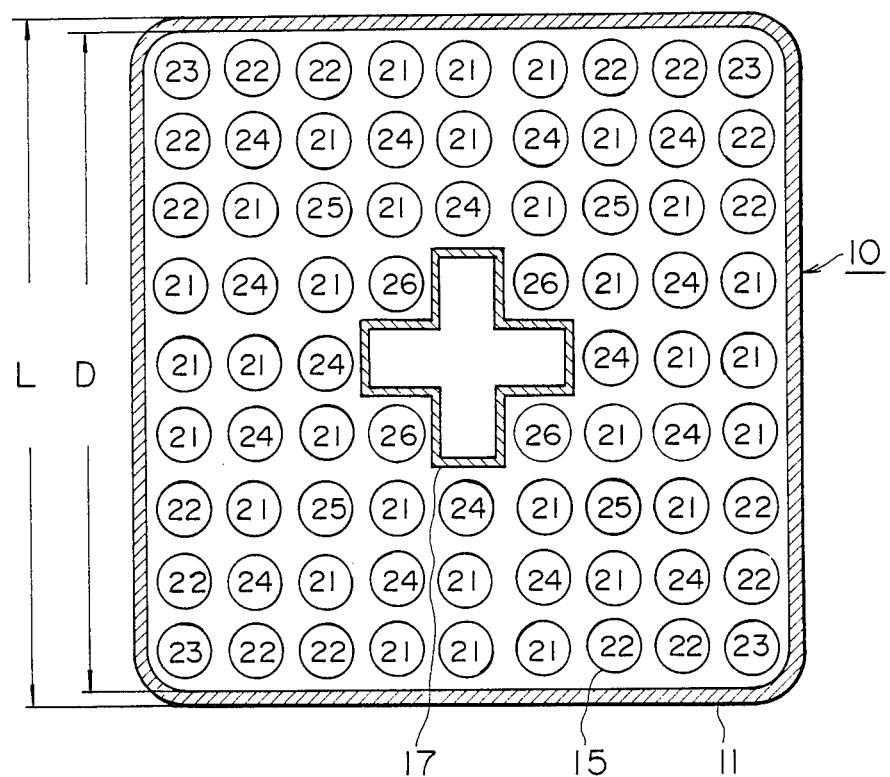
FIG. 4 is a sectional view taken along the line IV—IV of FIG 3.
Figure 5:
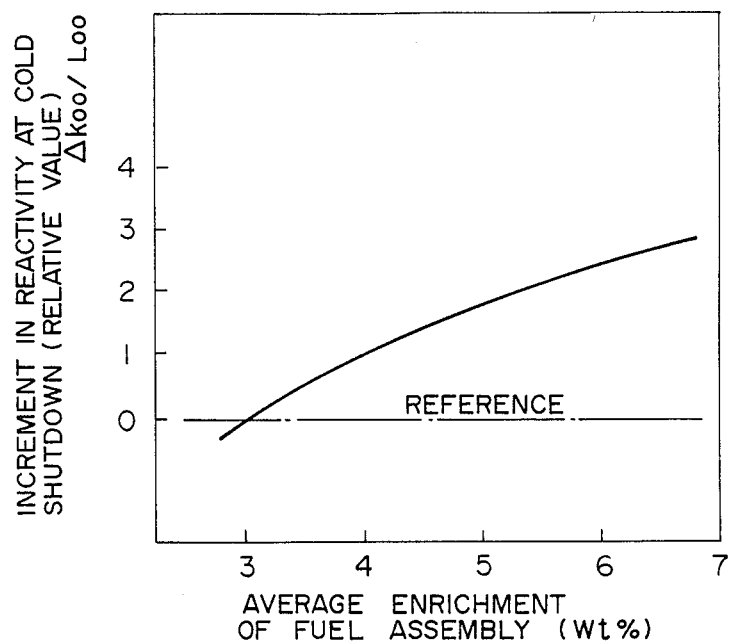
FIG. 5 is a diagram of characteristics showing the relationship between an average enrichment of a fuel assembly and an increment in reactivity at the time of cold shutdown.
Figure 6:
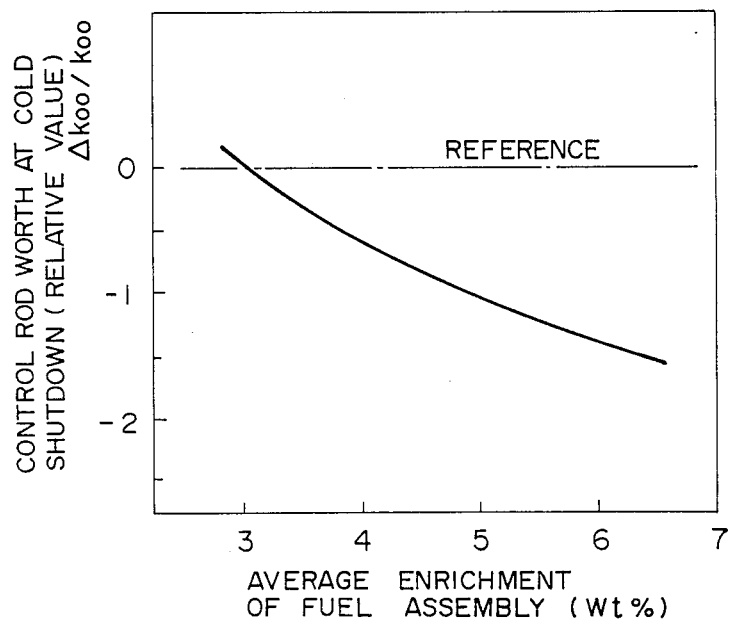
FIG. 6 is a diagram of characteristics showing the relationship between an average enrichment of a fuel assemble and a control rod worth at the time of cold shutdown.

FIGS. 5 and 6 respectively show the changes in reactivity and control rod worth at the cold shutdown with increases in the average enrichment of the conventional fuel assemblies (as shown in FIGS. 4C, 5A and 5B of Japanese Patent Laid-Open Publication No. 179391/1983) that are loaded in a conventional BWR core. Each of such conventional fuel assemblies has a distance L=13.75 cm and a distance D=13.25 cm. Each of the fuel assemblies has an average enrichment of 3 wt % and an average takeout burn-up of 28 GWd/t. FIGS. 5 and 6 show the characteristics of the fuel assembly wherein L=13.75 cm and D=13.25 cm when the average enrichment is increased from 3 wt %. L denotes the distance between the outer walls of a channel box, and D denotes the distance between the inner walls thereof (refer to FIG. 10).

For example, in order to increase the average takeout burn-up 1.5 times or more, it is necessary to increase the average enrichment of a fuel assembly to 4 wt % or more. However, in such fuel assembly having the increased average enrichment, at cold shutdown, the reactivity is increased by about 1% and the control rod worth is decreased about 0.7% as compared with the aforementioned conventional fuel assembly. As a result, it is presumed that the cold shutdown margin of a reactor which is provided as a barometer for indicating whether or not the reactor has the ability to be safely shutdown is decreased by about 2% $\Delta k_{eff}$. The aforementioned feature can be applied to the fuel assembly shown in FIG. 2 of Japanese Patent Laid-Open Publication No. 178387/1984. This fuel assembly has characteristics which show the same tendencies as those of the fuel assembly shown in FIGS. 5 and 6.

In order to fundamentally improve the nuclear properties described above, the ratio of moderator to fuel may be increased, and the average energy of neutrons may be decreased. The embodiments of the present invention have been achieved by paying attention to the effect of a moderator (light water) which is placed outside the channel box.

In view of the back fitting of a fuel assembly into the conventional BWR core, it is preferable to maintain an area of a coolant passage in the channel box approximately equal to that of the conventional fuel assembly from the viewpoints of removal of heat and stability due to pressure loss. Considerable methods of increasing the ratio of moderator to fuel while maintaining the area of the coolant passage constant are following two ones.

(1) Reduce an amount of the fuel charge, and increase a saturated water region within the channel box (water rod region).

(2) Reduce an amount of the fuel charge, and increase a saturated water region outside the channel box (gap water region).

Figure 7:
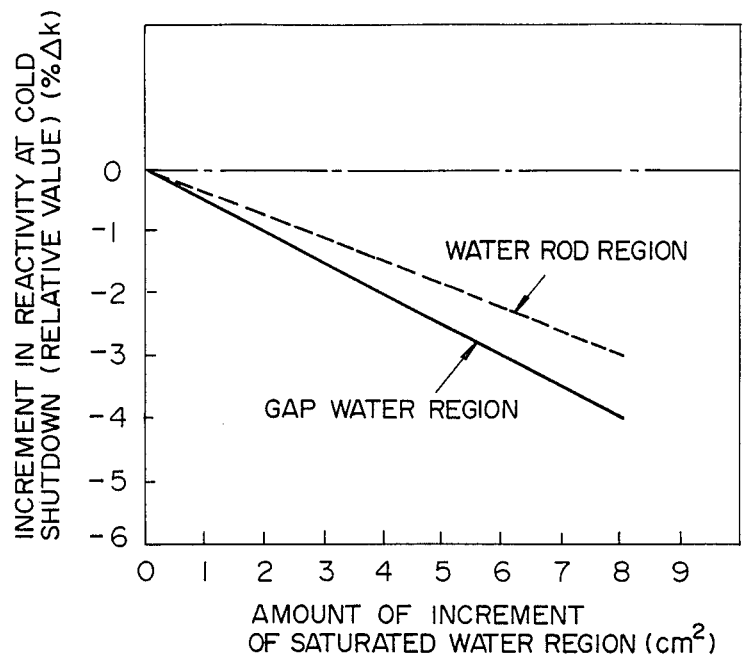
FIG. 7 is a diagram of characteristics showing the relationship between an increase in the saturated water region and an increment in reactivity at the time of cold shutdown.

FIG. 7 shows a comparison between the methods (1) and (2) with respect to the effect in terms of reducing the increments in reactivity at the cold shutdown. In FIG. 7, the dotted line shows the characteristic of method (1), and the solid line shows the characteristic of method (2). It will be understood that the method (2) exhibits an effect 1.3 times larger than that of method (1). This is because an increase in the gap water region produces a higher degree of concentration of the moderator rather than an increase in the water rod region does, and thus causes neutrons to be efficiently slowed down before being absorbed by fuel materials. As a result, in the method (2), the amount of thermal neutron fluxes in the gap water region is increased and then the control rod worth is also increased. On the other hand, in the method (1), the number of fuel rods must be reduced with an increase in the water rod region, resulting in a reduction in the thermal margin as compared with the method (2). It is thus shown that the method (2) is preferable.

Figure 8:
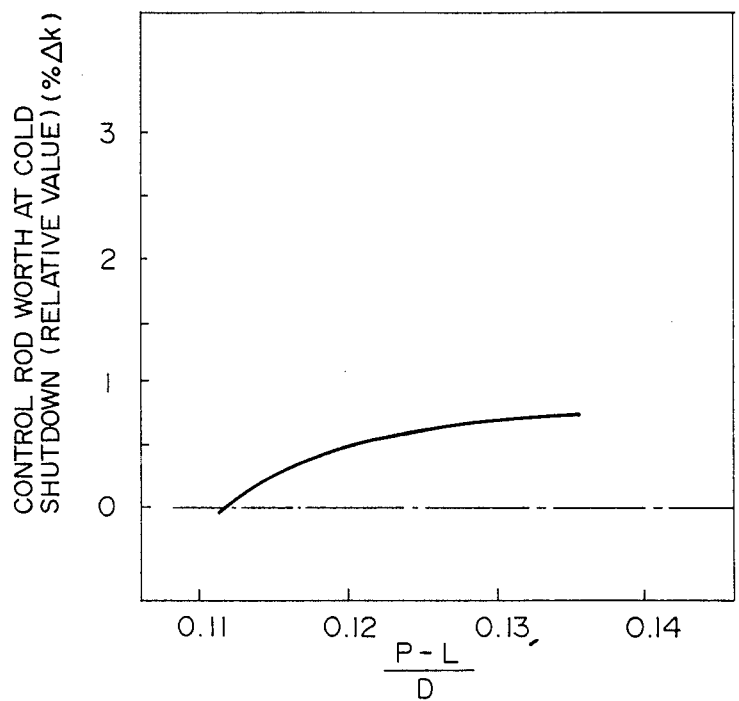
FIG. 8 is a diagram of characteristics showing changes in a control rod worth at the time of cold shutdown with respect to the value of $(P-L)/D$.
Figure 9:
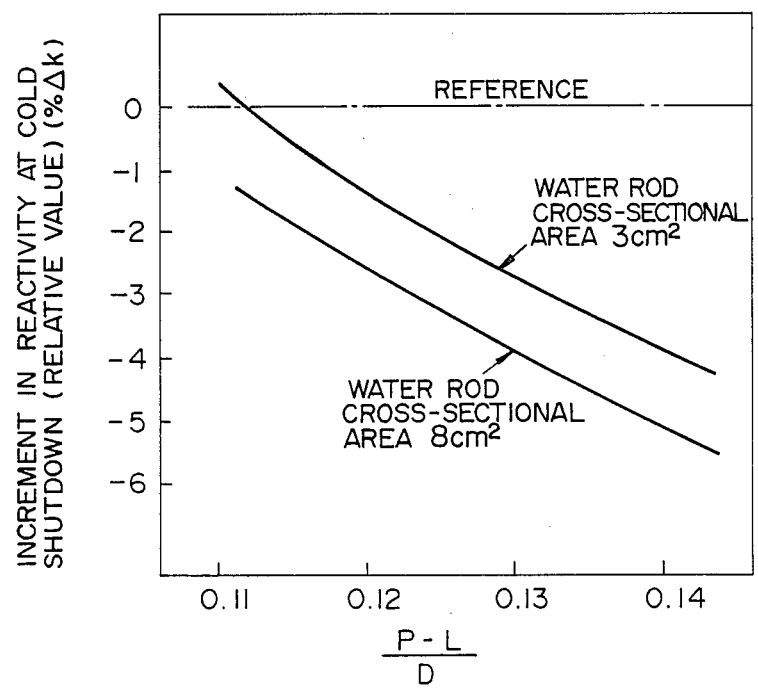
FIG. 9 is a diagram of characteristics showing changes in the increments in reactivity at the time of cold shutdown with respect to the value of $(P-L)/D$.

FIGS. 8 and 9 show the effects in the state wherein fuel assemblies are loaded in a reactor core. In FIGS. 8 and 9, (P—L)/D which is a parameter of the axis of abscissa indicates the ratio of a thickness of the gap water region surrounding the channel box to the distance D between the opposite inner side walls of the channel box, wherein P denotes the pitch of the fuel assemblies arranged in a reactor core, and L denotes the distance between the opposite outer side walls of the channel box which is provided in each of the fuel assemblies, as described above. When the cold shutdown margin of a reactor was investigated in respect of the fuel assembly having an average enrichment of 4 wt % or more, it was found from FIG. 8 that the control rod worth at the cold shutdown is rapidly decreased if the value of (P—L)/D becomes less than 0.12. Therefore, when the average enrichment of a fuel assembly is increased to 4 wt % or more in an attempt to increase the degree of burn-up, it is possible to secure a sufficient cold shutdown margin for a reactor by satisfying the condition (P—L)/D≧0.12. The dashed line in FIG. 8 shows the control rod worth of the conventional fuel assembly ((P—L)/D≈0.11) shown in Japanese Patent Laid-Open Publication No. 1793913/1983 at the cold shutdown. FIG. 9 shows the changes in the reactivity at the cold shutdown in respect of the value of (P—L)/D. The reference in FIG. 5 indicates the reactivity in respect of the above-described conventional fuel assembly. Even if the cross-sectional area of a water rod in the fuel assembly is changed, the sensitivity to the value (P—L)/D is the same. FIG. 9 shows examples of water rod having cross-sectional areas of 3 cm$^2$ and 8 cm$^2$, respectively. If the value of (P—L)/D is increased, the degree of increments in reactivity following the quenching of voids at the cold shutdown is reduced as compared with the conventional fuel assembly. When the value (P—L)/D is 0.12, at the cold shutdown, the increment in reactivity of the water rod having a cross-sectional area of 3 cm$^2$ is decreased by 1.4% $\Delta k$ and that of the water rod having a cross-sectional area of 8 cm$^2$ is decreased by 2.7% $\Delta k$, as compared with the reference value. When (P—L)/D is increased to a value above 0.12, the increments in reactivity are even further reduced than what is described above.

As described above, in order to secure a cold shutdown margin which is adequate for any increase in burn-up of a reactor, the value of (P—L)/D is preferably 0.12 or more.

Embodiments of the present invention are described below.

A preferred first embodiment of the present invention which is used in a BWR is described below with reference to FIGS. 1 to 4, especially FIGS. 3 and 4. A fuel assembly 10 of the first embodiment comprises an upper tie plate 13, a lower tie plate 14, fuel rods 15, a water rod 17, fuel spacers 16, and a channel box 11. Each of the fuel rods 15 is held at both ends thereof by the upper tie plate 13 and the lower tie plate 14. The water rod 17 has a cruciate cross-sectional form, and is disposed at a center of the fuel assembly 10 in the cross-sectional plane thereof. The water rod 17 is also held at both ends thereof by the upper tie plate 13 and the lower tie plate 14. Seven fuel spacers 16 are disposed in the fuel assembly 0 separate from each other in an axial direction of the fuel assembly. These fuel spacers 16 maintain a given gap between the respective fuel rods 15, as well as holding the fuel rods 15 in a bundle. The channel box 11 is mounted onto the upper tie plate 13 so as to surround the outside of the bundle of fuel rods 15 which are held together by the spacers 16.

The fuel rods 15 are arranged in 9 rows and 9 columns (9×9) so as to surround the water rod 17. The six separate types of fuel rods 21 to 26 described in the following Table 1 are used in the fuel rod 15.

TABLE 1

| Reference No. fuel rods | 21 | 22 | 23 | 24 | 25 | 26 |
|---|---|---|---|---|---|---|
| Enrichment (wt %) | 6.8 | 5.2 | 3.8 | 6.8 | 6.8 | 5.2 |
| Concentration of gadolinia (wt %) | — | — | — | 5 | 2 | 2 |

TABLE 1-continued

| Reference No. fuel rods | 21 | 22 | 23 | 24 | 25 | 26 |
|---|---|---|---|---|---|---|
| Number of fuel rods | 32 | 16 | 4 | 16 | 4 | 4 |

The enrichment of the fuel rods 21, 24 and 25 is 6.8 wt %, the enrichment of the fuel rods 22 and 26 is 5.2 wt %, and the enrichment of the fuel rod 23 is 3.8 wt %. Of these fuel rods, the fuel rods 24, 25 and 26 contain gadolinia which is a burnable poison. The concentrations of gadolinia in the fuel rod 24 and the fuel rods 25, 26 are 5 wt % and 2 wt %, respectively. The distributions of the enrichment and of the concentrations of gadolinia in the axial direction of each of the fuel rods are uniform within the effective fuel length (the height to which fuel pellets are charged). The fuel rods 21 to 26 are disposed as shown in FIG. 4. The average enrichment of the fuel assembly 10 is about 6 wt %.

The cross-sectional area of a cooling water passage in the water rod 17 is about 9 cm$^2$ which is greater than the cross-sectional area of 3 cm$^2$ of the cooling water passage in the conventional fuel assembly. The water rod 17 occupies the same cross-sectional area in the channel box 11 as that in which five fuel rods 15 are arranged. Such an increase in the cross-sectional area of the water rod 17 acts to remove non-uniformity in the distribution of neutron fluxes caused by any increase in the gap water region between the respective fuel assemblies 10 which are loaded within a reactor core, resulting in improvements in the thermal margin and fuel economy. The distance D between the opposite inner walls of the channel box 11 o the fuel assembly 10 is 13.09 cm and the distance L between the outer walls thereof is 13.60 cm.

Figure 1:
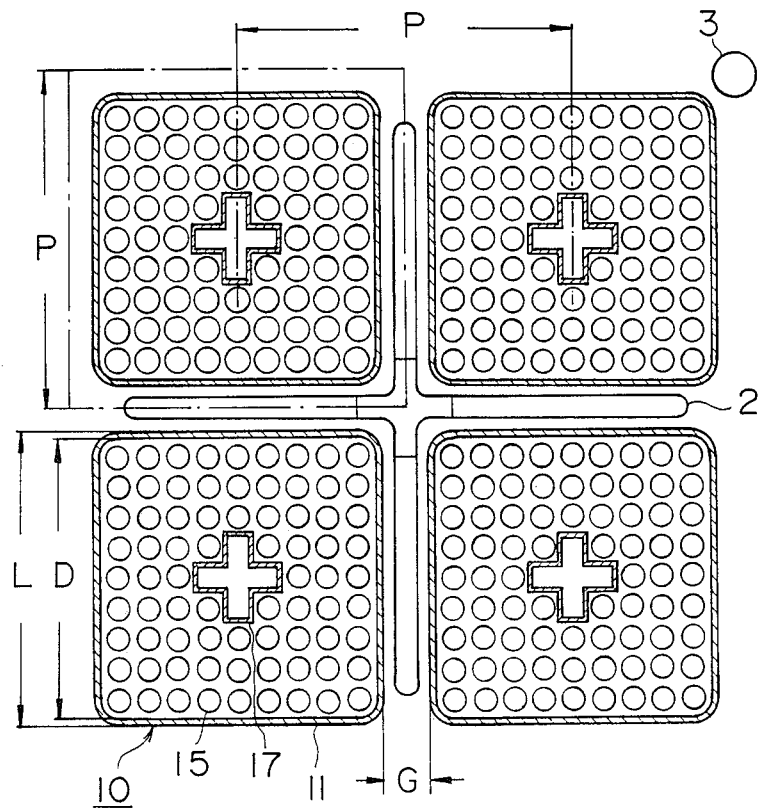
FIG. 1 is an enlarged view of a portion I of FIG. 2.
Figure 2:
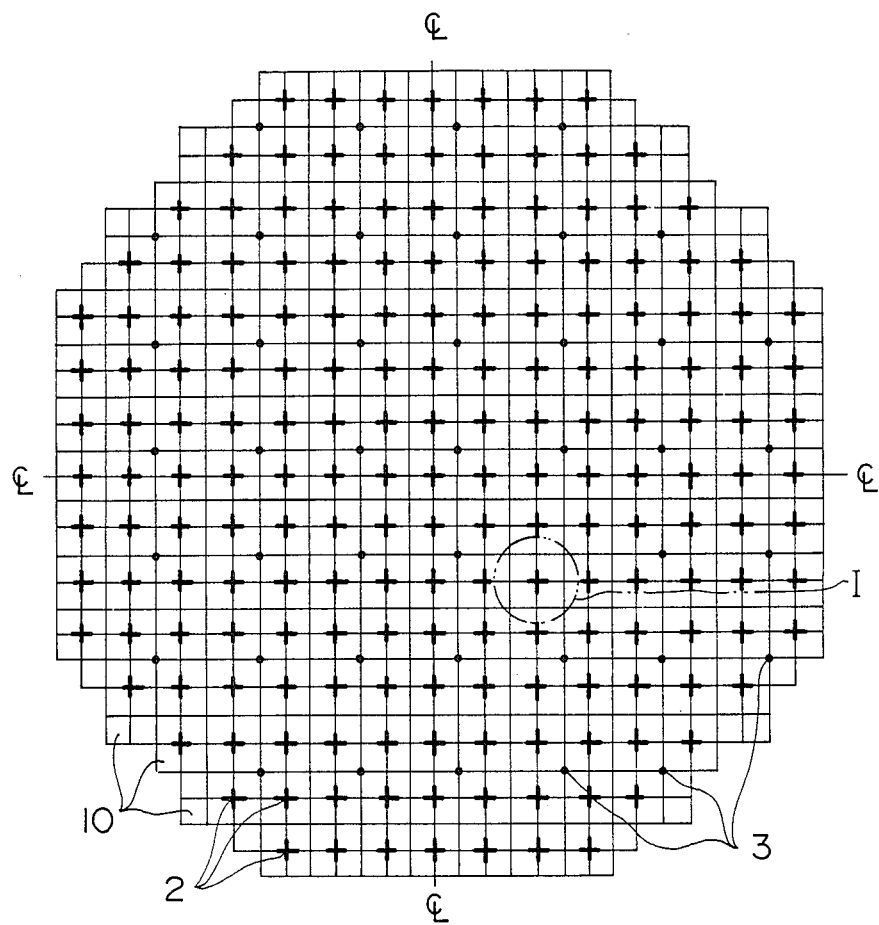
FIG. 2 is a cross-sectional view of a core of a BWR comprising a plurality of the fuel assemblies shown in FIG. 3.
Figure 3:
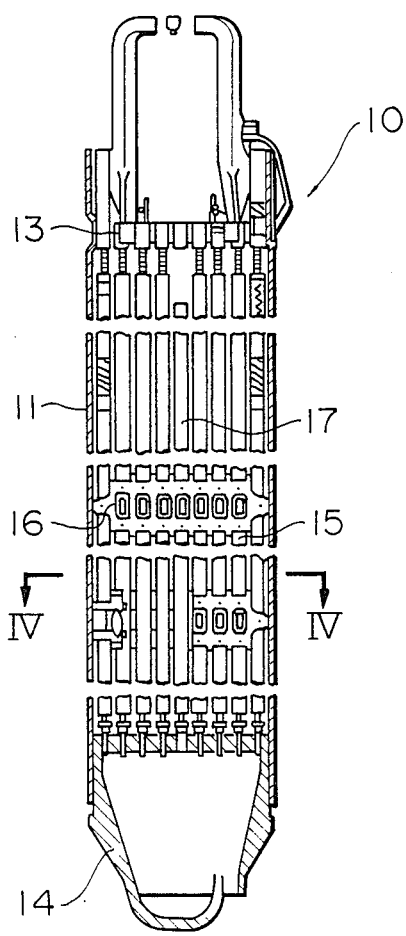
FIG. 3 is a longitudinal sectional view of an embodiment of the fuel assembly of the present invention.

The core of the BWR in which the fuel assemblies 10 are loaded has the arrangement shown in FIG. 2. FIG. 1 is an enlarged view of a portion I of the core shown in FIG. 2. The fuel assemblies 10 are arranged in the reactor core at a pitch P of 15.24 cm in the form of a lattice in the same way as that employed in the conventional fuel assemblies. Each of the fuel assemblies loaded in the core shown in FIG. 2 is the fuel assembly 10 shown in FIG. 1. A control rod 2 is so disposed as to be inserted into a gap among the four fuel assemblies 10 which are arranged adjacent to each other. Reference numeral 3 denotes neutron detectors.

Each of the fuel assemblies 10 has a value of $(P-L)/D$ of about 0.125. Thus, it can be seen from FIGS. 8 and 9 that a sufficient cold shutdown margin can be ensured by the fuel assemblies 10 of the first embodiment in a state wherein they are loaded in the core. In other words, when the average enrichment of each of the fuel assemblies 10 is increased by 3 wt % from the 3 wt % level of the conventional fuel assembly to 6 wt %, the increment in reactivity at the time of cold shutdown is increased by 2.5% $\Delta k/k$ from that of the conventional fuel assembly, while when the value of $(P-L)/D$ is increased from 0.11, the level of the conventional fuel assembly, to 0.125, the increments in reactivity at the time of cold shutdown can be decreased by 3.5% $\Delta k/k$ from the value obtained after being increased by 2.5% $\Delta k/k$. In addition, when the enrichment of each of the fuel assemblies 10 is increased as described above, the control rod worth at cold shutdown is reduced by 1.5% $\Delta k/k$ from that of the conventional fuel assembly, while when the value of $(P-L)/D$ is increased from 0.11 to 0.125, the control rod worth can be increased by 0.7% $\Delta k/k$ from the value obtained after being reduced by 1.5% $\Delta k/k$. The first embodiment can reduce the increments in reactivity at the time of cold shutdown to a value lower than that of the conventional fuel assembly, as described above, and, during the operation of a reactor, can obtain a void coefficient which is substantially the same that of the conventional fuel assembly. Therefore, the takeout burn-up of each of the fuel assemblies 10 can be increased to twice that of each of the conventional fuel assemblies by using the same structural materials as those of a core in which the conventional fuel assemblies are loaded, without any need to change the structural members thereof. In the first embodiment, the effect in terms of savings on uranium-consumption can be improved by about 20% and the amount of fuel reprocessed can be reduced by about 40% as compared with the conventional fuel assembly.

Figure 10:
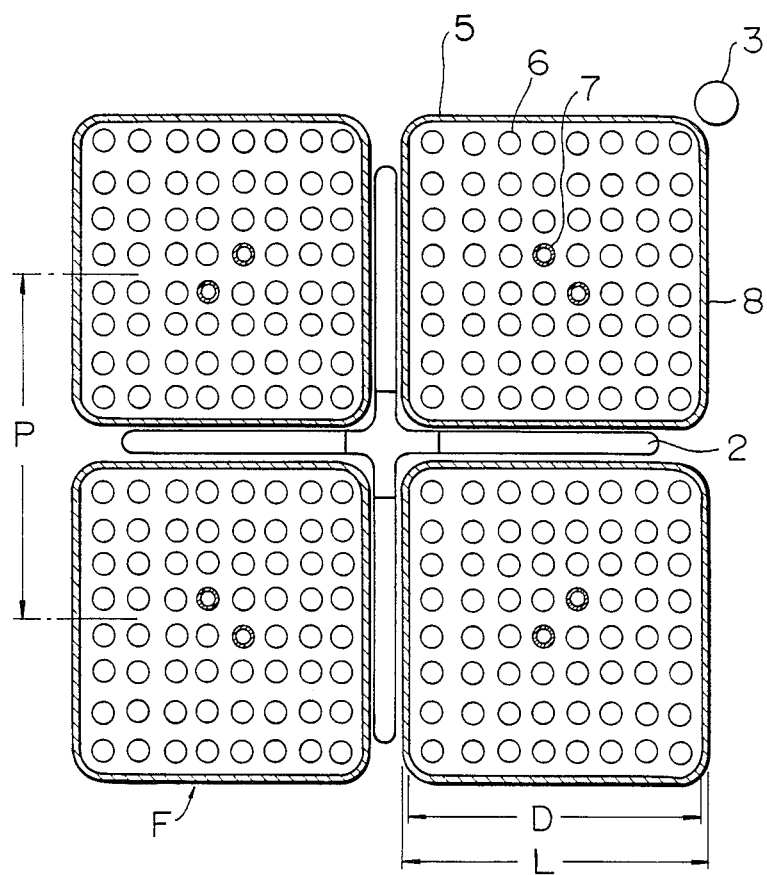
FIG. 10 is a local cross-sectional view of a conventional core of a BWR.
Figure 11:
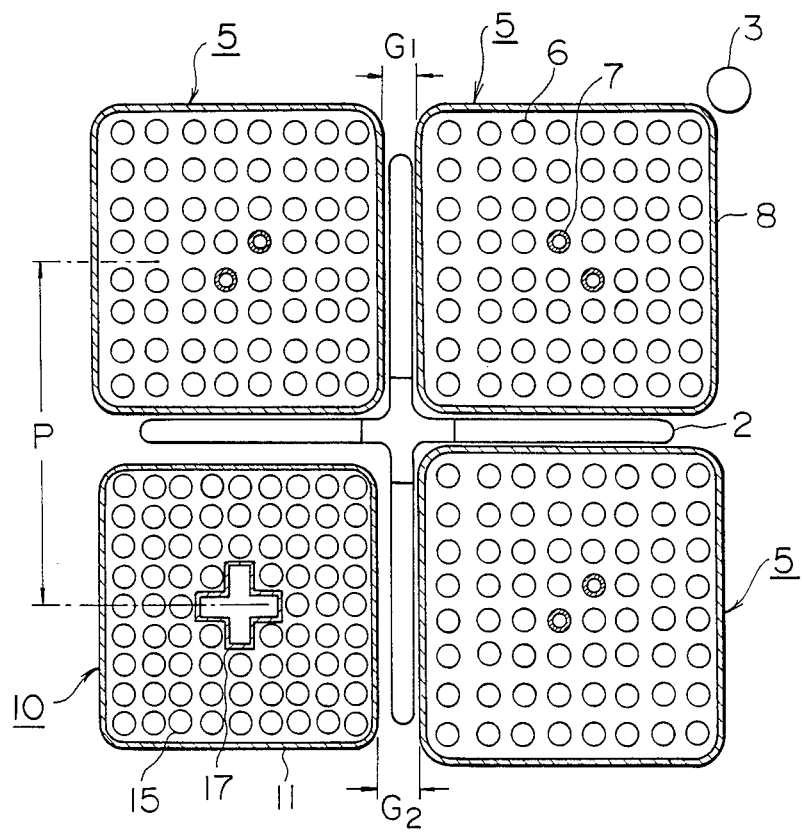
FIG. 11 is a cross-sectional view of the core shown in FIG. 10 wherein one fuel assembly is replaced by the fuel assembly shown in FIG. 4.

The procedure of changing the arrangement of a core comprising conventional fuel assemblies to the arrangement of a core comprising the fuel assemblies 10 exclusively is described below with reference t FIGS. 10 and 11. FIG. 10 shows a portion of a core in which the conventional fuel assemblies (shown in FIG. 4A of Japanese Patent Laid-Open Publication No. 179391/1983) are disposed exclusively. Each of the conventional fuel assemblies 5 comprises fuel rods 6 which are arranged in 8 rows and 8 comumns (8 × 8) in a channel box 8 and two water rods 7 which are diagonally disposed at a center of the channel box 8. The average enrichment of each of the fuel assemblies 5 is 3 wt %. The fuel assemblies 5 are arranged in the core at a pitch P of 15.24 cm. The distance D between the inner walls of the channel box 8 is 13.25 cm, and the distance L between the outer walls thereof is 13.75 cm. Therefore, the channel box of each of the fuel assemblies 5 satisfies the equation $0.12 < (P-L)/D$. In generally, four fuel assemblies constitute a one cell, which are disposed adjacent to one control rod 2 such as to surround it, and one quarter of the fuel assemblies in the core are replaced by new fuel assemblies in each shutdown of the reactor for one fuel cycle. The fuel assemblies 10 are used as the new fuel assemblies. In other words, after the operation of one fuel cycle has been completed, one of the fuel assemblies 5 in the cell which has reached the end of its lifetime (for example, the fuel assembly 5 shown by the arrow F in FIG. 10) is discharged from the core, and a new fuel assembly is loaded in this position in its place. FIG. 11 shows the state wherein one fuel assembly 5 has been removed, and the fuel assembly 10 has been loaded in its place. The distance L (13.60 cm) between the outer walls of the channel box 11 of the fuel assembly 10 is smaller than that (13.75 cm) of the channel box 8 of the fuel assembly 5. Therefore, the width $G_2$ of a gap water region formed between the fuel assembly 5 and the fuel assembly 10 is greater than that $G_1$ of the gap water region formed between the fuel assemblies 5. Thereafter, the fuel assemblies 5 in the cell are replaced one by one by a new fuel assembly 10 each time the operation of one fuel cycle has been completed. After the three fuel cycles have been completed, the state shown in FIG. 11 is changed to the state shown in FIG. 1 wherein all the fuel assemblies 5 in the core are replaced by the fuel assemblies 10. Namely, all the fuel assemblies in the core are the fuel assemblies 10. The width G of the gas water region formed between the fuel assemblies 10 in FIG. 1 is greater than the width $G_2$ in FIG. 11.

The type of core shown in FIG. 10 having a low degree of burn-up can be easily changed to the core shown in FIG. 1 having a high degree of burn-up simply by changing the structure of each of the fuel assemblies in the BWR through the above-described operation of changing the fuel assemblies, without any need to change the structure of the other members of the core.

Figure 12:
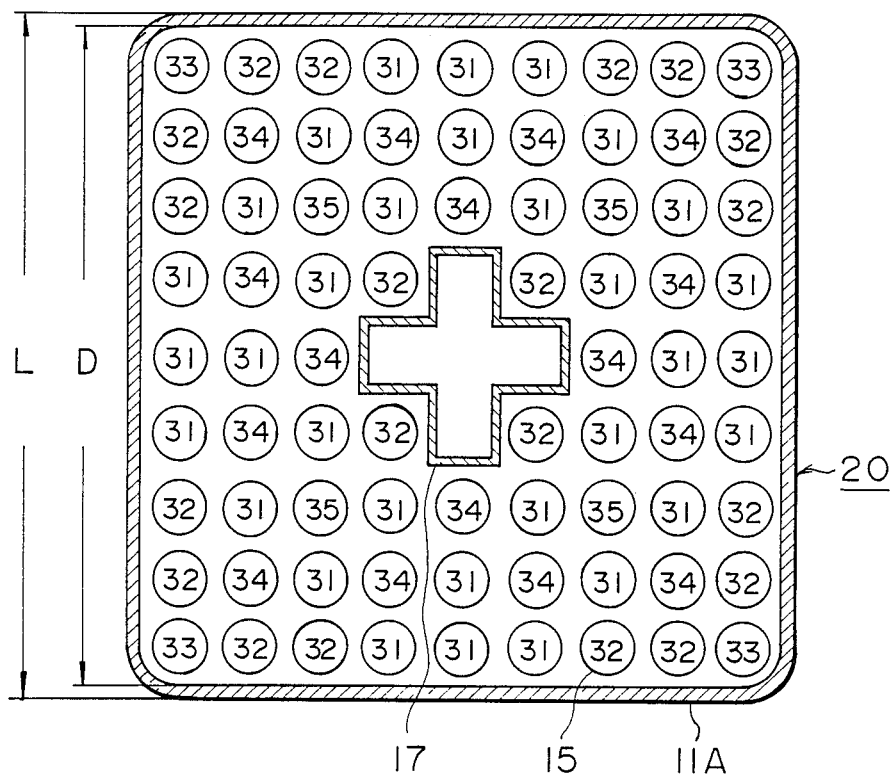
FIG. 12 is a cross-sectional view of another embodiment of the fuel assembly of the present invention.

A second embodiment of the fuel assembly of the present invention will be now described hereinunder with reference to FIG. 12. A fuel assembly 20 of the second embodiment has the same shape as that of the fuel assembly 10 shown in FIG. 4. The fuel assembly 20 is different from the fuel assembly 10 with respect to the distributions of enrichment of the fuel rods 15 and of the concentrations of gadolinia therein. In other words, the fuel assembly 20 comprises the separate types of the fuel rods 31 to 35 listed in the following Table 2, which are arranged as shown in FIG. 12.

TABLE 2

| Reference No. of fuel rods | 31 | 32 | 33 | 34 | 35 |
|---|---|---|---|---|---|
| Enrichment (wt %) | 6.0 | 4.3 | 2.8 | 6.0 | 6.0 |
| Concentration of gadolinia (wt %) | — | — | — | 5 | 2 |
| Number of fuel rods | 32 | 20 | 4 | 16 | 4 |

Of the fuel rods 31 to 35, the fuel rods 34 and 35 contain gadolinia. The enrichment of each of the fuel rods and the concentrations of gadolinia thereof in Table 2 are values within the effective fuel length and are uniform within this length. The distance L between the outer walls of a channel box 11A of the fuel assembly 20 is 13.66 cm, and the distance D between the inner walls of the channel box 11A is 13.15 cm. The average enrichment of the fuel assembly 20 of the second embodiment is 5 wt %.

The value of $(P-L)/D$ of the fuel assembly 20 is about 0.12. A sufficient cold shutdown margin which is the same as that with the fuel assemblies 10 can be obtained in the state wherein the fuel assemblies 20 are loaded in the core. In other words, when the average enrichment of each of the fuel assemblies 20 is increased by 2 wt % from 3 wt % in the conventional fuel assemblies to 5 wt %, the increments in reactivity at the cold shutdown is increased by 1.7% $\Delta k/k$ from that with the conventional fuel assemblies, while when the value $(P-L)/D$ is increased from 0.11 to 0.12, the increments in reactivity at the cold shutdown can be reduced by 2.7% $\Delta k/k$ from the value obtained after being increased by 1.7% $\Delta k/k$. In addition, the above-described increase in the average enrichment causes the control rod worth at the cold shutdown to be reduced by 1.1% $\Delta k/k$, while an increase in the value $(P-L)/D$ from 0.11 to 0.12 allows the control rod worth to be increased by 0.5% $\Delta k/k$ from the value obtained after being reduced by 1.1% $\Delta k/k$.

The core of the BWR in which all the fuel assemblies are the fuel assemblies 20 can be obtained from the core shown in FIG. 10 by the same operation of changing fuel assemblies as that used for the fuel assemblies 10.

The second embodiment can produce the same effect as that of the first embodiment.

In both embodiments, it is preferable for improvements in stability, safety, and economy, and the achievement of a high degree of burn-up to configure the fuel assembly in such a manner that, in the fuel assembly in which a weight ratio of fissionable materials to nuclear fuel materials in a cross-sectional plane vertical to the axial direction of the fuel assembly in a portion of 80% or more of an intermediate portion excluding the upper and the lower end portions thereof is 4% or more, the outer width L of the channel box and the inner width D thereof are determined so as to satisfy the following equation:

$$0.12D \leq P - L$$

As described above, the present invention is capable of preventing as much as possible increments in reactivity at the time of cold shutdown and a reduction in a control rod worth at the time of cold shutdown by reducing the size of the fuel assembly relative to the fuel assembly pitch and increasing each of the gap water regions, and thus is capable of ensuring a sufficient cold shutdown margin for a reactor.

What is claimed is:

1. A fuel assembly to be loaded in a reactor core with a pitch P from the other ones, said fuel assembly comprising:
    a plurality of fuel rods;
    a water rod disposed within said fuel rods; and
    a channel box surrounding the bundle of said fuel rods, said channel box having a width L between outer walls thereof and a width D between inner walls thereof, both of which satisfy the following equation:

$$0.12 \leq (P-L)/D.$$

2. A fuel assembly according to claim 1, wherein an average enrichment of said fuel assembly is 4 wt % or more.

3. A fuel assembly according to claim 1, wherein said water rod has a cross-sectional shape occupying a region in which five said fuel rods can be arranged.

4. A reactor core comprising a plurality of fuel assemblies which are loaded in said reactor core with a pitch P from the other ones, each of said fuel assemblies including:
    a plurality of fuel rods;
    a water rod disposed within said fuel rods; and
    a channel box surrounding the bundle of said fuel rods, said channel box having a width L between outer walls thereof and a width D between inner walls thereof, both of which satisfy the following equation:

$$0.12 \leq (P-L)/D.$$

5. A fuel assembly according to claim 4, wherein an average enrichment of said fuel assembly is 4 wt % or more.

6. A fuel assembly according to claim 4, wherein said water rod has a cross-sectional shape occupying a region in which five said fuel rods can be arranged.

7. A method for loading fuel to a reactor comprising the following steps of:
    disloading a first fuel assembly from a reactor core of said reactor, which first fuel assembly is loaded in said reactor core with a pitch P from the other ones, and includes a plurality of first fuel rods, a first water rod disposed within said first fuel rods, and a first channel box surrounding the bundle of said first fuel rods, said first channel box having a width L1 between outer walls thereof and a width D1 between inner walls thereof, both of which satisfy the following equation $$0.12 > (P-L_1)/D_1; \text{ and}$$

loading a second fuel assembly at the position at which said first fuel assembly disloaded has been positioned, said second fuel assembly includes a plurality of second fuel rods, a second water rod disposed within said second fuel rods, and a second channel box surrounding the bundle of said second fuel rods, said second channel box having a width L between outer walls thereof and a width D between inner walls thereof, both of which satisfy the following equation $$0.12 \leq (P-L)/D.$$

8. A method for loading fuel to a reactor according to claim 7, wherein said second fuel assembly having an average enrichment of 4 wt % or more is loaded in the position at which said first fuel assembly disclosed has been positioned in said reactor core.

9. A method for loading fuel to a reactor according to claim 8, wherein said second fuel assembly including said second water rod having a cross-sectional shape occupying a region in which five said second fuel rods can be arranged is loaded in the position a which said first fuel assembly disloaded has been positioned in said reactor core.

* * * * *